Patented Oct. 25, 1949

2,486,235

UNITED STATES PATENT OFFICE 2,486,235

HARD SMOOTH CRAZE-RESISTANT SURFACE COATING

William T. Watt, Stamford, Conn., assignor to American Cyanamid Company, New York, N. Y., a corporation of Maine No Drawing. Application March 2, 1945, Serial No. 580,731

1 Claim. (Cl. 154—45.9)

This invention relates to craze-resistant coatings on surfaces such as wood or paper laminates and to processes for producing same.

The production of plywood having a glossy, craze-resistant surface intricately bonded therewith, has often been attempted with very little success. This is primarily due to the fact that compositions which have been used have required such high pressures that any coating which was applied to the surface would be very thin. Other coating materials not requiring high pressures which have been proposed do not have sufficient adhesion to the wood surface, and do not dry completely tackfree if a cover sheet is not used. Urea- and melamine-formaldehyde condensation products are examples of the first of the aforementioned types of coating materials whereas, copolymerizable compositions containing an unsaturated alkyd resin and a substance containing the $CH_2=C<$ group, such as styrene, are examples of the second type of coating material.

An object of the present invention is to produce hard, glossy, craze-resistant coatings on wood surfaces such as on plywood.

Another object of the present invention is to provide hard glossy, craze-resistant coatings on various types of materials including resin bonded laminated materials.

These and other objects are attained by applying to a surface to be coated a composition made by blending a polymerizable substantially anhydrous melamine-formaldehyde condensation product alkylated with an alcohol having 1–4 carbon atoms with a compatible polymerizable mixture containing a substance having a $CH_2=C<$ group, and having a boiling point of at least 100° C. and a polymerizable unsaturated alkyd resin to form a homogeneous polymerizable composition having said condensation product and said polymerizable mixture present in a weight ratio between about 1:20 and 3:2, and thereafter polymerizing said composition with or without a cover sheet, and with or without pressure.

The following examples in which the proportions are in parts by weight are given by way of illustration and not in limitation.

EXAMPLE 1

Component "A" is prepared by blending 80 parts of an unsaturated alkyd resin (Resin "A") with 20 parts of styrene, while component "B" is prepared by blending 80 parts of a methylated melamine - formaldehyde resin (100% solids) (condensation product "A") with 20 parts of styrene.

625 parts of component "A" are mixed with 375 parts of component "B" to provide a homogeneous composition having a viscosity of about 378 poises. To this composition 0.5% of lauric peroxide and 0.3–0.4% of methyl acid pyrophosphate are added and intimately mixed with said composition. It is desirable that no air, or as little air as possible, be mixed into the resinous composition while blending components "A" and "B" and while blending the peroxide and pyrophosphate therewith.

A plywood panel is coated with the aforementioned homogeneous composition and shims of about 3–10 mils in thickness are placed around the edges. Any air which may be entrapped in the resin is allowed to escape, after which a polished plate of glass or metal is placed upon the resin, preferably together with a paper or cloth backing, which is used in order to overcome any unevenness of pressure which might result from high spots on the plate. An assembly is now pressed at a pressure of about 100 p. s. i. and at a temperature between about 250° F. and 275° F. for about 8–10 minutes. The assembly is removed from the press and the polished plate is immediately stripped from the plywood. The plywood has a hard craze-resistant coating tenaciously and intricately bonded to the wood fibers. This composition is found to be resistant to cold checking and to have excellent solvent resistance. The coating is not attacked after four hours contact with butyl acetate, absolute ethyl alcohol, 50% acetic acid, 5% sodium hydroxide or 14% ammonia. The coating is also resistant to hot oil.

EXAMPLE 2

Example 1 is repeated except that the homogeneous composition used for the coating applied to the plywood contains 67 parts of component "A," 27 parts of component "B" and 7 parts of styrene. This composition has a viscosity of about 122 poises and is somewhat easier to apply than the composition of Example 1 but it has the disadvantage that it tends to squeeze out during the pressing operation.

Preparation of resin "A"

3.15 mols of ethylene glycol, 2 mols of phthalic anhydride and 1 mol of fumaric acid is mixed together in a suitable reaction vessel and esterified by heating at a temperature of 150–200° C. to form an alkyd resin having an acid number of about 25–60.

Unsaturated alkyd resins suitable for use in accordance with the present invention are those which are polyesters of an alpha, beta unsaturated dicarboxylic acid with a polyhydric alcohol. Glycols are preferably used as the polyhydric alcohol and examples of these are, ethylene glycol, diethylene glycol, triethylene glycol, trimethylene glycol, alpha-propylene glycol, octadecandiol, decamethylene glycol, neopentyl glycol, etc. Mixtures of the glycols may be used and the polyesters may be modified with monohydric alcohols and/or monocarboxylic acids.

While any of the alpha, beta unsaturated dicarboxylic acids, including maleic acid, itaconic acid and citraconic acid may be used, fumaric acid is preferred. Part of the alpha, beta unsaturated dicarboxylic acid may be replaced by other polycarboxylic acids, including succinic acid, adipic acid, sebacic acid, phthalic acid, endomethylenetetrahydrophthalic anhydride etc. The use of a dicarboxylic acid which does not contain an alpha, beta unsaturation subject to polymerization is desirable in order to modify the characteristics of the vinyl compound and in some cases in order to obtain compatibility with the substance containing the $CH_2=C<$ group with which it is copolymerized.

The term "acid" as used herein is intended to cover the anhydride which may be used in place of the acid whenever available.

While it is generally preferable that the polyester contain substantially equivalent proportions of hydroxyl groups and carboxyl groups an excess of hydroxyl groups is desirable in some instances.

The unsaturated alkyd resins should have a low acid number, that is below 100 and preferably below 60. The use of 5-10 mol per cent of glycol in excess of that theoretically required to react with all the acid present is preferable and in general, the resins should be formulated with the alcohol present in slight excess, but resins may also be used which contain about theoretically equivalent proportions of hydroxyl and carboxyl groups.

*Preparation of condensation product "A"*

About 267 parts of 37% aqueous formaldehyde (3.3 mols) are charged into a kettle provided with an agitator and a means for heating. The pH of the aqueous formaldehyde is adjusted to about 8 by means of sodium hydroxide, after which 126 parts of melamine (1 mol) are added. The resulting mixture is heated with agitation until all of the melamine is dissolved, which generally requires a temperature of about 80° C. The resulting syrup is discharged into trays, cooled, and permitted to solidify, which requires about 4-5 hours. The solidified resin thus obtained is broken into lumps and dried at about 50° C. for approximately 10 hours. The hard lumps of resin obtained after drying have a moisture content of about 2-3% and are then ground.

100 parts of the ground melamine-formaldehyde condensation product, prepared in accordance with the above description, are mixed with 200 parts of methanol (95%) in which 0.5 part of crystalline oxalic acid has been dissolved. The resulting mixture is heated in a suitable reaction vessel provided with an agitator and brought to the reflux point and maintained at this point until the melamine-formaldehyde condensation product is all dissolved, which requires about 10-20 minutes. The reacting mixture may be heated for an additional period of time up to a maximum of about 30 minutes. The pH of the resulting syrup is immediately adjusted to about 9-9.5 with a 5 N. solution of sodium hydroxide. The syrup is now filtered under pressure in a filter press, preferably after the addition of a filter aid such as diatomaceous earth. The filtrate is now concentrated under vacuum at a temperature of about 50°-60° C. under a moderate vacuum which is gradually increased until a vacuum of 26-27 inches of mercury is obtained. The temperature gradually rises to a maximum of not over about 100° C. When the syrup is substantially completely dehydrated the distillation is stopped, at which point the concentration of resin solids is about 100%. The product is cut back to 80% solids with styrene and about 0.05% or less of hydroquinone or p-tertiary butyl catechol is added as a stabilizing agent.

Alkylated melamine-formaldehyde condensation products may be prepared in general in the manner described in Patent No. 2,197,357 but the methylated condensation products prepared preferably in accordance with the disclosure in application Serial No. 568,780, filed by Herbert J. West and William T. Watt. The ethylated, propylated or butylated melamine-formaldehyde condensation products are useful but for most purposes the methylated products are preferable.

The styrene employed in the foregoing example may be replaced by other substances containing the $CH_2=C<$ group which have a boiling point above about 100° C. Examples of such substances are vinyl hydrocarbons including o-, m-, p-methyl styrenes, alpha, methyl styrene, 2,4-dimethyl styrene, 2,3-dimethyl styrene, 2,5-dimethyl styrene, 2,6-dimethyl styrene, 3,4-dimethyl styrene, the isopropenyl toluenes, vinyl naphthalene etc. The polyallyl esters such as diallyl phthalate, diallyl terephthalate, diallyl sebacate, diallyl succinate, diallyl maleate, diallyl fumarate, triallyl phosphate, triallyl tricarballylate, diallyl ester of ethylene glycol carbonate, etc. Mixtures of substances containing the $CH_2=C<$ group may be used if desired.

It has been found that my compositions containing a methylated melamine-formaldehyde condensation product, a substance containing the $CH_2=C<$ group and an unsaturated alkyd resin are not sufficiently stable for long periods of time and, accordingly, our examples show the preparation of the mixtures in two components, each of which is stable during storage for reasonable periods of time. The two components may be easily blended together and the resulting compositions have a work life of from a few hours to a day or more. It has also been found that the working life of the compositions used in accordance with this invention may be improved by the addition of a small proportion, e. g., 0.1-1%, of an acid ester of a phosphoric acid such as methyl acid pyrophosphate employed in the preceding examples. This ester is dimethyl dihydrogen pyrophosphate, but any of the esters of any of the phosphoric acids, which esters contain one or more active (unesterified) hydrogens are useful, such as for example monobutyl orthophosphate, diethyl orthophosphate, monopropyl orthophosphate, dibutyl dihydrogen pyrophosphate, etc.

In order to effect the copolymerization of the unsaturated alkyd resin with a substance containing the $CH_2=C<$ group it is desirable that a polymerization catalyst be incorporated into our compositions prior to polymerization. Examples of such substances are benzoyl peroxide, benzoyl acetic peroxide, lauric peroxide, coconut oil acid peroxides, oleic peroxide, stearic peroxide, tertiary hydrobutyl peroxide, etc.

Our compositions may be used with or without the addition of pigments, dyes, fillers, etc. In some instances it is desirable that a filler such as glass fibers, alpha cellulose pulp, asbestos fibers, mica, etc., be included in our compositions. Similarly, in order to produce opaque materials, pigments such as titanium oxide may be employed.

While my invention has been particularly described with reference to the coating of plywood, it is also applicable to the coating of wood surfaces generally. My invention is also adapted for use in coating laminated materials, particularly paper laminates, for example, those which contain a phenol-formaldehyde resin as a binder for sheets of paper. In some instances it may be desirable to apply coatings of the type described herein to surfaces such as metal surfaces etc. In the foregoing examples covered sheets were used and pressure was employed. However, this is not always necessary or desirable, and, in such cases, the coating may be applied to a wood surface or to any other surface by any desired means, such as spraying, and thereafter subjected to a temperature preferably of the order of 150° C. At such temperatures the copolymerizable composition contained in the coating composition sets immediately, and there is very small loss of styrene or other vinyl compound which may be lost if there is no cover sheet and if somewhat lower temperatures which are insufficient to set the composition are used. The loss of styrene is not always undesirable and, accordingly, I am not limited to the use of high temperatures. When the cover sheet is used or when the coated material is pressed between platens the latter being in effect cover sheets, temperatures in the neighborhood of 110° C. are preferable for effecting the cure of the coating compositions.

Obviously many variations and changes in the compositions, processes and products disclosed herein may be made without departing from the spirit and scope of the invention as defined in the appended claim.

I claim:

A plywood carrying a hard, smooth, craze-resistant coating on the surface thereof, which coating is a cured polymer of a composition comprising a polymerizable methylated melamine-formaldehyde condensation product and a compatible mixture of styrene and an unsaturated alkyd resin obtained by esterifying a glycol and fumaric acid, the weight ratio of said condensation product to said polymerizable mixture being between 1:20 and 3:2 and in which said polymerizable mixture contains from 28 to 34% by weight styrene based on the total amount of the polymerizable mixture present.

WILLIAM T. WATT.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,218,474 | Moore | Oct. 15, 1940 |
| 2,255,313 | Ellis | Sept. 9, 1941 |
| 2,280,242 | Kropa et al. | Apr. 21, 1942 |
| 2,305,224 | Patterson | Dec. 15, 1942 |

OTHER REFERENCES

Industrial and Eng. Chem., vol. 33, No. 6, June 1941, pages 769–71.

Ind. and Eng. Chem., vol. 33, No. 6, June 1941, page 778.